June 19, 1934.  S. S. SWANSON ET AL  1,963,478
MANURE SPREADER
Filed Aug. 12, 1931   3 Sheets-Sheet 1
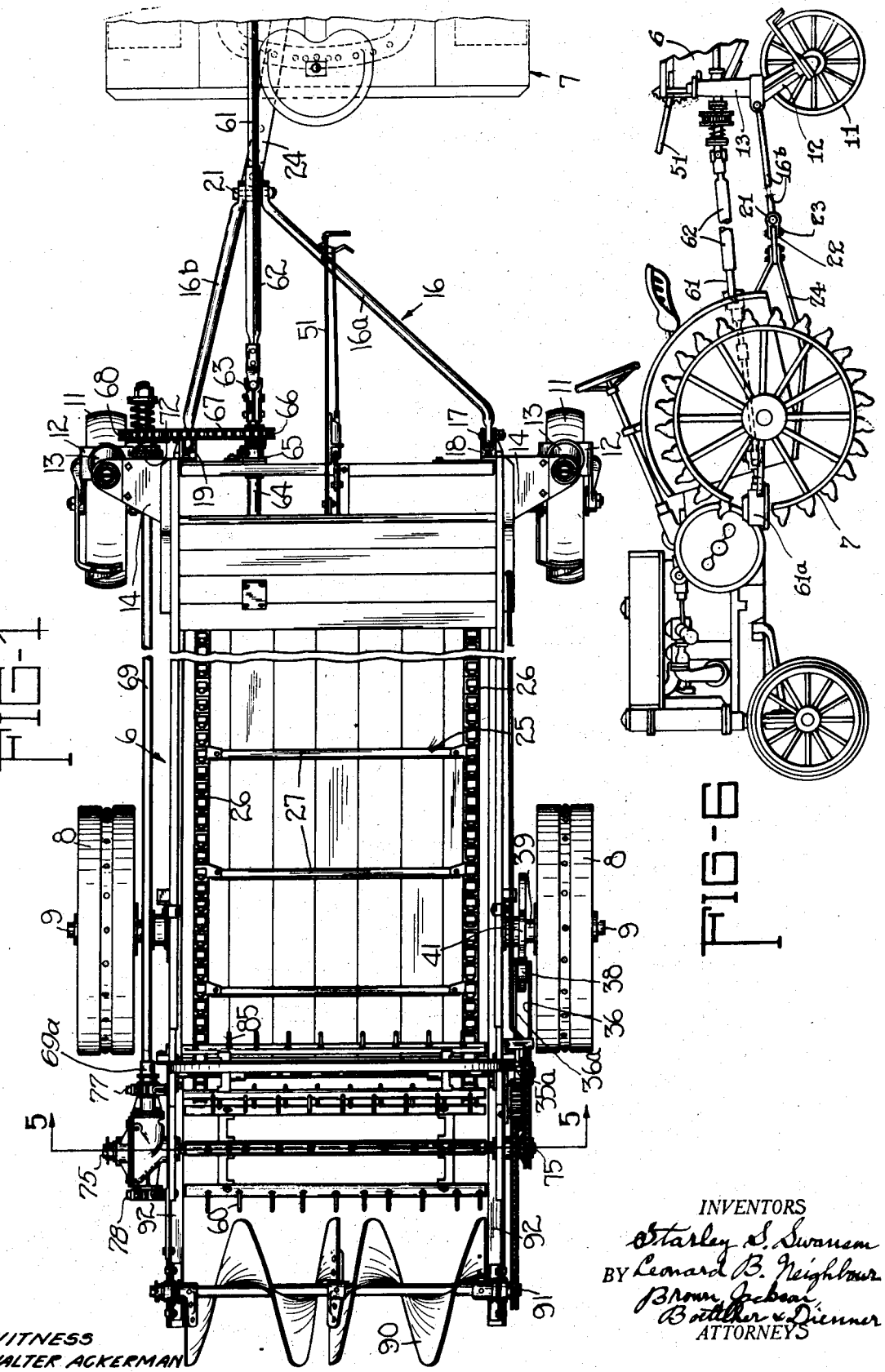
WITNESS
WALTER ACKERMAN
INVENTORS
Stanley S. Swanson
Leonard B. Neighbour
BY Brown Jackson
Boettcher & Dienner
ATTORNEYS

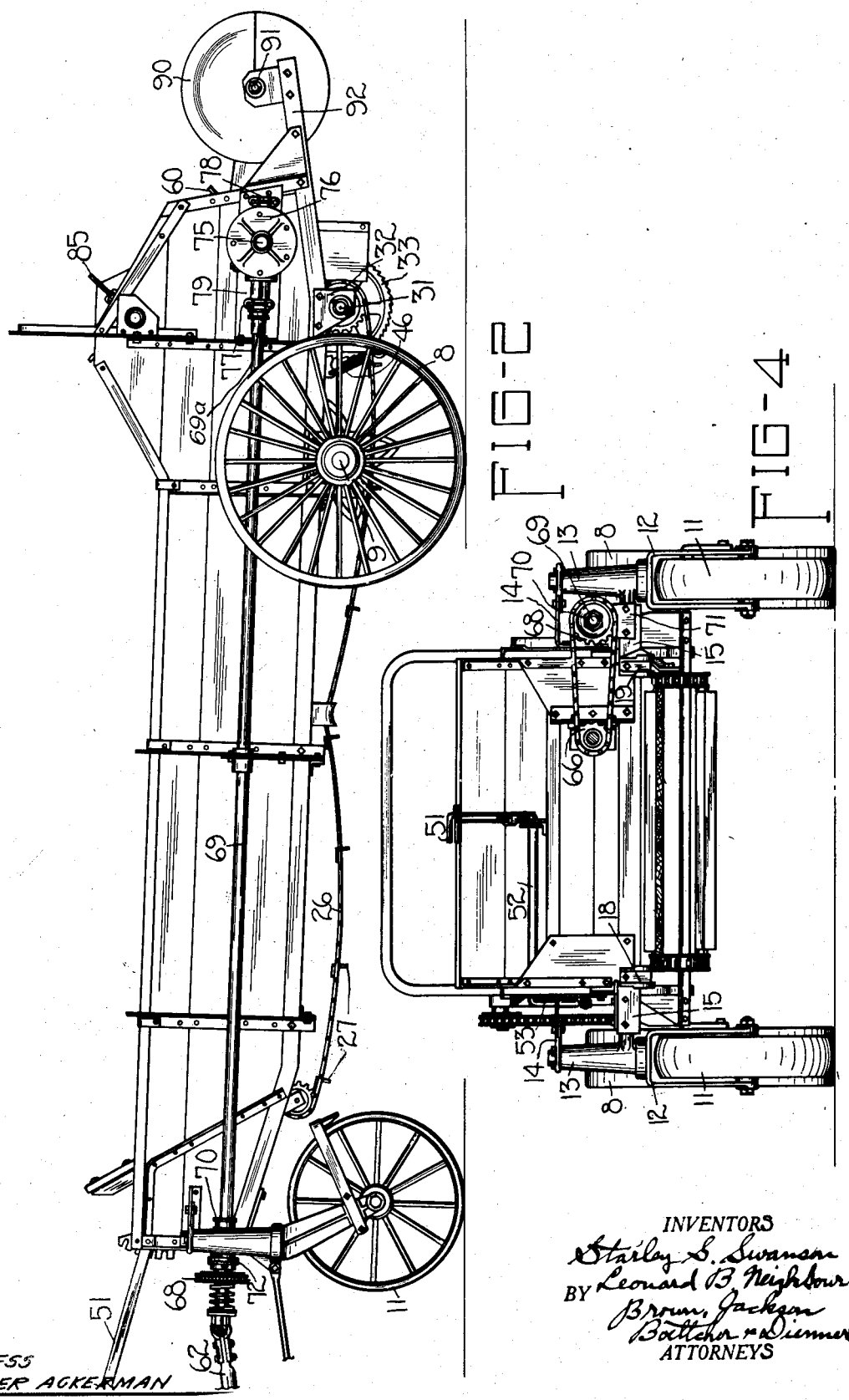

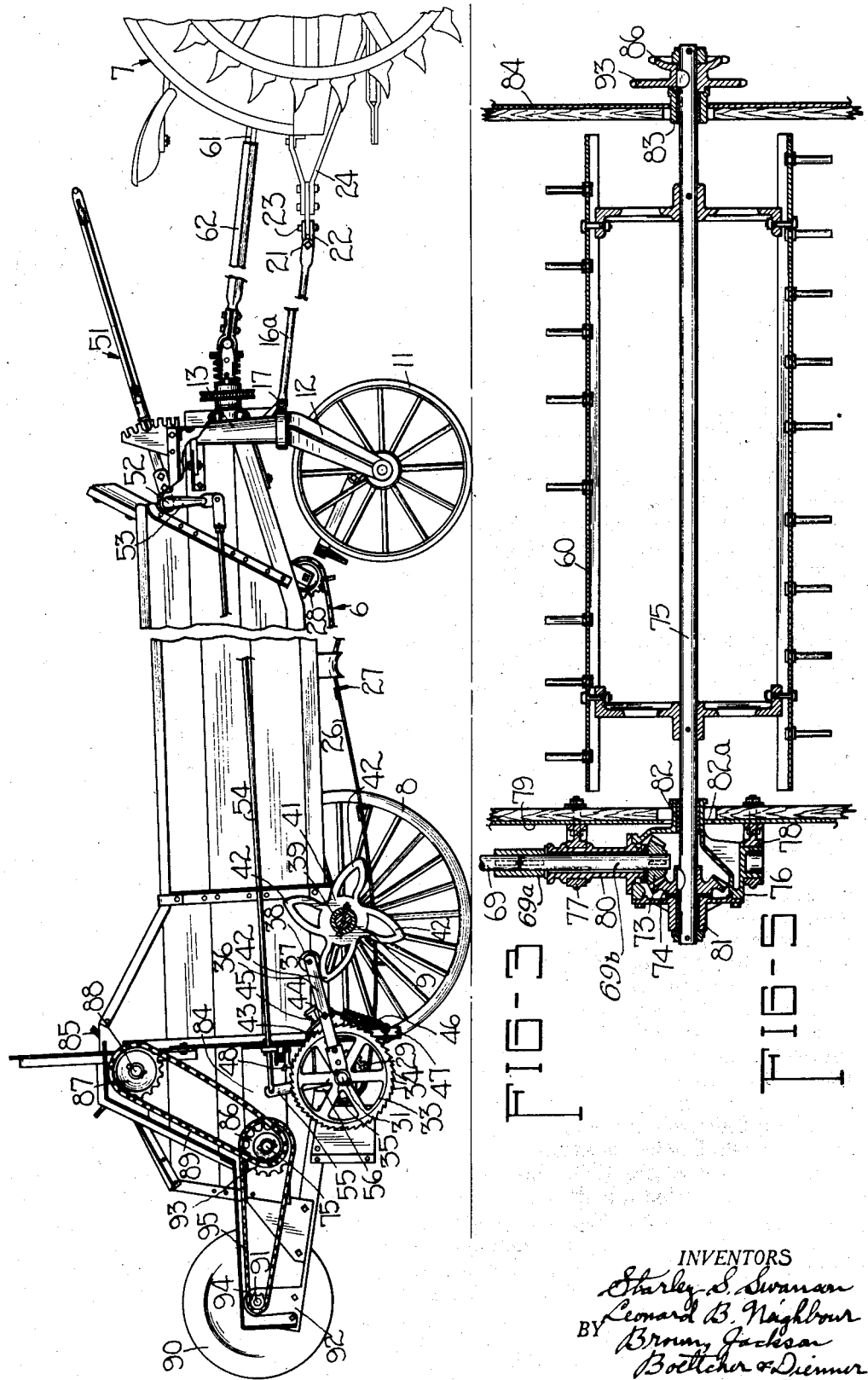

Patented June 19, 1934

1,963,478

UNITED STATES PATENT OFFICE 1,963,478

MANURE SPREADER

Starley S. Swanson and Leonard B. Neighbour, Moline, Ill., assignors to Deere & Company, Moline, Ill., a corporation of Illinois Application August 12, 1931, Serial No. 556,498

11 Claims. (Cl. 275—3)

The present invention relates to fertilizer distributors of the well known type adapted to be propelled by a tractor having a power take-off connection with the tractor motor, and comprising a vehicle body mounted on front and rear wheels, beating mechanism and a wide spread device mounted adjacent the rear end of the vehicle body, and a traveling conveyor, the upper course of which feeds the contents of the vehicle gradually rearwardly to the distributing apparatus.

In all prior power driven devices of this type with which we are familiar it has been customary to drive all of the operating parts of the distributor by power derived from the power take-off connection with the tractor, and all of such operating parts were driven at a constant speed irrespective of whether the tractor was driven in high gear or in low gear. To obtain the best results, it has been determined, however, that while it is desirable that the beater or beaters and wide spread device of the distributor be operated at a constant speed, regardless of the rate of speed of forward advance of the vehicle, it is not desirable that the traveling conveyor which feeds the manure or other material to the beater or beaters be operated at such constant speed, but rather that such conveyor should be driven at a speed proportionate to the rate of forward advance of the vehicle. With the old type of distributor in which the various parts are driven from the power take-off connection if a farmer has certain places in his field at which it is desirable to operate the tractor in low gear and other places at which it is desirable to operate in high gear, it is necessary with such devices for the operator to change the speed adjustment of the traveling conveyor when shifting the tractor from one speed to another in order to maintain a constant rate of deposit per acre, which constant rate of deposit is of course desirable as a farmer ordinarily determines in advance the amount of manure or other fertilizer he wishes to deposit per unit of an area, for example, a certain number of loads to the acre. Making this adjustment every time he changes the speed of the tractor is of course objectionable for obvious reasons.

The principal object of our present invention is to provide driving means for the various operating mechanisms of the distributor whereby the necessity of the operator making any such speed adjustment of the traveling conveyor is obviated, and whereby the beater or beaters and wide spread device will operate at all times at a constant speed, and whereby the traveling conveyor will operate at a rate of speed proportionate to the rate of forward advance of the vehicle across the field.

Another object of the invention is to provide supporting wheels for the forward end of the distributor in the form of caster wheels, and to provide a tongue for connecting the distributor to the tractor, said tongue being so mounted as to swing in a vertical plane with respect to the distributor but which is held against swinging in a horizontal plane, whereby no difficulty is encountered in backing the distributor by operation of the tractor.

A further object of the invention is to provide improved means for pivotally supporting the bevel gear housing at the rear of the distributor which supports two of the bearings in which the beater shaft is journaled, whereby said housing is free to oscillate or rock about an axis perpendicular to the beater shaft so that the said two bearings will automatically align themselves with the other bearing at the opposite side of the distributor in which the opposite end of the beater shaft is journaled.

Other objects and advantageous features will be apparent from the following description of the preferred embodiment of our invention taken in connection with the accompanying drawings, in which:

Figure 1 is a top plan view of a fertilizer distributor connected with the rear end of a tractor and equipped with our improvement;

Figure 2 is a side elevation of the left hand side of the distributor as shown in Figure 1, illustrating the means for driving the beaters and wide spread device from the power take-off of the tractor;

Figure 3 is a side elevation of the right hand side of the distributor as shown in Figure 1, illustrating the means for driving the traveling conveyor by power derived from the rear supporting wheels of the vehicle;

Figure 4 is a front view of the distributor, illustrating the manner in which the front caster wheels are connected to the front of the vehicle body;

Figure 5 is a sectional view taken on the line 5—5 of Figure 1 and illustrating the pivotal connection of the bevel gear housing and the bearing means for the main beater shaft; and Figure 6 is a side view on a reduced scale illustrating the power take-off connection between the engine of the tractor and the fertilizer distributor.

Referring to the drawings, the distributor body is indicated as an entirety by the numeral 6, while the tractor is indicated by the numeral 7. The distributor is supported at the rear on two wheels 8 mounted on an axle 9 and provided with ratchets to cause rotation of the axle upon forward movement of the distributor. As such ratchet constructions are old in the implement art it is not deemed necessary to illustrate or describe them herein.

The forward end of the body 6 is supported on caster wheels 11 mounted in forks 12. The upper ends of said forks are journaled in vertical sleeves 13 fixed to the body of the distributor in any suitable manner, as by means of upper and lower brackets 14 and 15 respectively secured to and extending outwardly from the side members of the body at the forward ends thereof. The caster wheels 11 have full castering movement about their vertical axes through 360°, which is very desirable in tractor propelled distributors as the provision of such caster wheels together with our improved tongue construction to be presently described greatly facilitates the backing of the distributor by backing the tractor.

For connecting the distributor to the tractor a laterally rigid tongue 16 is provided, said tongue comprising two bars 16a and 16b respectively connected at their rear ends by horizontally extending pivot bolts 17 to brackets 18 and 19 secured to and extending outwardly from the opposite ends of the front portion of the distributor as shown in Figure 1. The forward ends of the bars 16a and 16b converge toward each other as shown and are connected together by a horizontally extending pivot bolt 21 and a pivot connection 22 pivoted at its rear end on said bolt 21. By means of a vertically extending pivot bolt 23, the pivot block 22 connects the front end of the tongue 16 with the rear end of the draw bar 24 of the tractor, as shown in Figure 3. When pulling the distributor the draw bar 24 of the tractor is locked against both vertical and horizontal swinging movement with respect to the tractor in any suitable manner, as is customary in structures of this type. By providing the laterally rigid tongue for connecting the distributor with the tractor and the caster wheels at the forward end of the distributor capable of castering movement about 360°, backing and steering of the distributor upon backing of the tractor is greatly facilitated, as will be readily understood.

The material to be distributed is carried in the body of the distributor and is caused to travel gradually rearwardly therein when the machine is in operation by an endless conveyor or apron 25 of a well known type, which operates in the lower portion of the body and may in some instances form the bottom thereof. This conveyor comprises a pair of laterally spaced horizontally extending endless chains 26 connected together at spaced points therealong by transversely extending slats or bars 27 extending therebetween (see Figure 1). At the front of the load carrying portion of the body, the apron is trained around and supported by sprockets 28, while at the rear of the body the apron is trained around and driven by sprockets 29 fastened on a shaft 31 suitably supported in bearing brackets 32 secured to the sills of the body (see Figure 2).

The conveyor is moved rearwardly by rotation of the shaft 31 by power derived from the rear axle 9 and the means for rotating said shaft upon rotation of said axle to accomplish such movement is best shown in Figure 3 and will now be described. Keyed to the shaft 31 at the side of the body is a wheel 33 provided with ratchet teeth 34 on its periphery. Pivoted upon the shaft 31 and disposed outside of the wheel 33 is a sleeve 35. An arm comprising two laterally spaced members 36 and 36a, extending respectively on the outer and inner sides of the wheel 33 is provided, the rear end of the member 36 being secured to said sleeve 35. The other arm 36a is secured at its rear end to a second sleeve 35a (see Figure 1) pivoted on the shaft 31 on the inner side of the wheel, and the purpose of the arm 36a and sleeve 35a will be hereinafter described. The two members 36, 36a of said arm are connected together at their forward ends by a stud 37, and a roller 38 is journaled on said stud between said members as shown in Figure 1.

Keyed to the rear axle 9 is a sleeve 39 provided with a web 41, the periphery of which is of an irregular shape to form a series of cams 42, which are adapted successively to engage the roller 38 as the axle 9 turns. As viewed in Figure 3, when the roller is in engagement with one of the cams clockwise rotation of the sleeve 39 and cams 42 upon forward movement of the distributor will force the outer or forward end of the arm 36 upwardly, the roller traveling along the face of the cam 42. A dog 43 which is pivotally connected to the arm 36 by a pivot stud 44 and which is pressed against the teeth 34 of the wheel 33 by a spring 45, will cause the wheel to rotate with the arm during its upward movement and, consequently, drive the shaft 31 and move the conveyor rearwardly of the body. When the roller travels off the end of the cam 42 the arm 36 is caused to swing downwardly into position to be engaged by the next succeeding cam by a spring 46, one end of which is suitably secured to the arm 36 and the other end of which is connected with a bracket 47 fastened to the side of the body. It is of course understood that upon the downward or return swing of the arm the dog 43 will ratchet over the teeth of the wheel 33. During such return movement of the arm 36, the wheel is held against reverse movement by a spring pressed dog 48 secured to the side of the body and adapted to engage the ratchet teeth, as is usual in such constructions.

The amount of movement imparted to the wheel 33 upon each downward movement of the arm 36, and consequently the extent to which the apron 25 is moved toward the distributing mechanism at the rear of the distributor, is governed by a detent lever 51 fixed to a shaft 52 supported at the forward end of the body and having a depending arm 53. A rod 54 pivotally connected at one end to the lower end of the arm 53 extends longitudinally rearwardly and has its opposite end pivotally connected to an arm 55 pivotally mounted on the shaft 31 of the ratchet mechanism. The position of this arm 55 controls the degree of angular movement given to the ratchet arm 36 through its contact with a stop member 56 fixed to and extending upwardly from the inner member 36a of the arm 36. When the arm 55 is in its forwardmost position the arm 36 is permitted to move downwardly its maximum distance, whereupon rotation of the cam wheel 42 will shift the conveyor its maximum extent.

The distributing mechanism comprises a main beater, an auxiliary beater and a wide spread device, and these parts together with the mechanism for driving the same will now be described. The main beater of the distributor is indicated by the reference numeral 60, and is driven from the power take-off shaft 61 of the tractor. Said power take-off shaft is connected at its forward end with power take-off mechanism of any conventional design enclosed in the housing 61a and deriving power from the tractor engine. Said shaft extends longitudinally rearwardly from the tractor and is square in cross section at its rear portion (see Figures 1 and 3). This power take-off shaft telescopes within a longitudinally extending tubular shaft 62 provided with a square bore for receiving said first shaft, whereby said tubular shaft is driven by said power take-off shaft. The tubular shaft is connected by a universal joint connection 63 with a third longitudinally extending shaft 64 supported in suitable bearings provided at the forward portion of the body 6, one of said bearings being shown in Figure 1 and indicated by the numeral 65. Keyed to said third shaft between the bearing 65 and the universal joint connection 63 is a sprocket 66 around which is trained a chain 67, said chain being also trained around a second sprocket 68 having driving connection with a long longitudinally extending shaft 69 positioned alongside the body 6 whereby said shaft 69 is driven by the power take-off shaft of the tractor by the various parts just described, as will be readily understood. The forward end of the shaft 69 is supported in a bearing 70 supported by a bracket 71 suitably secured to the side of the body of the distributor. A spring controlled slip clutch 72 is provided in the line of the shaft 69 in rear of the sprocket 68 for a purpose to be hereinafter described.

The shaft 69 extends rearwardly to a point adjacent the rear end of the body and its rear end is keyed to a connecting collar 69a which in turn is keyed to the forward end of a stub shaft 69b. Fixed on the rear end of said shaft 69b as shown in Figure 5 is a bevel gear 73 which meshes with a second bevel gear 74 fixed on the adjacent end of a transversely extending shaft 75 which carries and drives the main beater 60 before mentioned. The bevel gears 73 and 74 are enclosed by a suitable housing 76 pivotally supported in bearing brackets 77 and 78 fixed to a plate 79 suitably secured to the side of the body (see Figures 2 and 5). The stub shaft 69b enters the housing 76 through a sleeve 80 carried by the housing, in which sleeve the shaft is journaled on an axis concentric with the axis about which the housing 76 is free to rock, i. e., the pivot axes between the housing and the brackets 77 and 78.

One end of the main beater shaft 75 is journaled in transversely extending bearings 81 and 82 provided in the housing 76, while the opposite end of said shaft is journaled in a third bearing 83 at the opposite side of the body. The bearing 82 extends through an enlarged hole 82a in the plate 79, to permit vertical movement of the bearing as will be presently described. The bearing 83 is suitably supported in a plate 84 (see Figures 3 and 5) suitably fixed to the right hand side of the body. By the foregoing construction the housing 76 is free to rock in the bearings 77 and 78, and the bearings 81 and 82 at the left hand end of the shaft 75 as shown in Figure 5 will automatically align themselves with the bearing 83, this alignment being permitted by clearance of the bearing 82 in the perforation 82a provided in the plate 79 as above described.

The distributor is also provided with an auxiliary beater 85 positioned above and forward of the main beater 60, as is usual in machines of this type (see Figures 1 and 3). The auxiliary beater is driven from the shaft 75 of the main beater 60 through the instrumentality of a sprocket 86 keyed to said shaft, a second sprocket 87 keyed to the shaft 88 of the auxiliary beater 85, and a chain 89 trained around said sprockets, as shown in Figure 3.

A wide spread device of the usual construction is located in rear of the main beater 60 and indicated by the numeral 90, and the shaft 91 of said wide spread device is suitably supported in bearings carried by extensions 92 suitably secured to and extending rearwardly from the side members of the body of the distributor, as is usual in structures of this character. The wide spread device is driven from the main beater shaft 75 through the instrumentality of a sprocket 93 preferably but not necessarily cast integral with the sprocket 86 mounted on the shaft 75, a second sprocket 94 keyed to the shaft 91 of the wide spread device, and a chain 95 trained around said sprocket, as is shown in Figure 3.

It will be seen from the foregoing that the main and auxiliary beaters, and also the wide spread device, are all driven from the power take-off connection with the tractor. As the speed of the motor of the tractor, and therefore also the speed of the power take-off shaft driven thereby, is maintained substantially constant by reason of the governor control with which farm tractors of this type are provided, irrespective of whether the tractor is being operated in low gear or in high gear, the beaters and wide spread device are also driven at a constant speed, which is very desirable as before explained.

The traveling conveyor or apron being connected with and driven from the axle 9 of the rear supporting wheels 8 of the distributor as above described, the speed of such apron will be automatically proportional to the speed of forward advance of the distributor. For example, if the tractor is thrown into low gear the speed of forward travel of the distributor will be correspondingly slowed up, which will automatically slow up the speed of the apron driven from the ground wheels 8 of the distributor, whereas when the tractor is thrown into high gear the distributor will travel at a higher rate of speed which will automatically increase the speed of the apron, as will be readily understood, yet the speed of the beater mechanism will remain substantially constant.

The spring controlled clutch 72 adjacent the forward end of the shaft 69 is provided so that in case the main beater 60 or other parts driven by the shaft 69 becomes clogged with fertilizer, or are prevented from rotating from one cause or another, the clutch 72 will be thrown out, breaking the driving connection between the shaft 69 and the sprocket 68 which is being driven from the sprocket 66 on shaft 64 which is in turn driven by the power take-off shaft, thereby preventing breakage of parts which might otherwise occur if this clutch were not provided, as will be readily understood.

We claim:—

1. A fertilizer distributor adapted to be propelled by a tractor and comprising supporting wheels, a beater, and a traveling conveyor, of means for driving said beater from the engine of the tractor at a constant speed regardless of the rate of speed at which the tractor is traveling, and means for driving the traveling conveyor from the supporting wheels of the distributor whereby the speed of the conveyor is proportionate to the rate of advance of the distributor.

2. A fertilizer distributor adapted to be propelled by a tractor having a power take-off connection with the engine of the tractor, comprising in combination supporting wheels for the distributor, a beater mounted on the distributor, a traveling conveyor for conveying the material to said beater, means for driving said beater from said power take-off connection, and means for driving said traveling conveyor from said supporting wheels.

3. A fertilizer distributor adapted to be propelled by a tractor having a power take-off connection with the engine of the tractor, comprising in combination supporting wheels for the distributor, a beater mounted on the distributor, a traveling conveyor for conveying the material to said beater, a wide spread device mounted on the distributor in rear of said beater, means for driving said beater and said wide spread device from said power take-off connection, and means for driving said endless conveyor from said supporting wheels.

4. A fertilizer distributor adapted to be propelled by a tractor having a power take-off connection with the engine of the tractor, comprising in combination supporting wheels for the distributor, a beater mounted on the distributor, a traveling conveyor for conveying the material to said beater, means for driving said beater from said power take-off connection, and means for intermittently driving said traveling conveyor from said supporting wheels.

5. A fertilizer distributor adapted to be propelled by a tractor having a power take-off connection with the engine of the tractor, comprising in combination supporting wheels for the distributor, a beater mounted on the distributor, a traveling conveyor for conveying the material to said beater, means for driving said beater at a constant speed from said power take-off connection, means for intermittently shifting said traveling conveyor rearwardly along the body of the distributor by power from said supporting wheels, and means for controlling the rate of said intermittent rearward movement of said conveyor.

6. A fertilizer distributor adapted to be propelled by a tractor having a power take-off connection with the engine of the tractor and comprising, in combination, an axle, supporting wheels mounted on said axle, operative means connected therewith to rotate the same upon forward movement of the distributor, a beater mounted on the distributor, a traveling conveyor for conveying the material to said beater, means for driving said beater at a constant speed from said power take-off connection, means connecting said traveling conveyor with said rear axle whereby said conveyor is moved intermittently a predetermined distance rearwardly upon each revolution of said axle, and adjusting means for varying the distance moved by said conveyor upon each revolution of said axle.

7. An implement for distributing material comprising a compartment for holding the material to be distributed, distributing means, means for feeding material from the compartment to the distributing means at a rate proportional to the rate of travel of the implement, and means for operating said distributing means at a substantially uniform rate irrespective of the rate of travel of the implement.

8. An implement for distributing material comprising a wheel supported compartment for holding the material to be distributed, distributing means, means deriving power from the supporting wheels for feeding the material from the compartment to the distributing means at a rate proportional to the rate of travel of the implement, and means for operating said distributing means at a substantially uniform rate irrespective of the rate of travel of the implement.

9. An implement for distributing material comprising a compartment for holding the material to be distributed, distributing means, means for intermittently feeding the material from the compartment to the distributing means at a rate proportional to the rate of travel of the implement, and means for operating said distributing means at a substantially uniform rate irrespective of the rate of travel of the implement.

10. An implement for distributing material comprising a compartment for holding the material to be distributed, distributing means, means for intermittently feeding the material from the compartment to the distributing means at a rate proportional to the rate of travel of the implement, means for operating said distributing means at a substantially uniform rate irrespective of the rate of travel of the implement, and means for varying the intermittent feeding of the material.

11. A material distributor comprising a beater, means for driving said beater at a constant speed regardless of the rate of travel of the distributor, and means for feeding material to said beater at a rate proportional to the rate of travel of the distributor.

STARLEY S. SWANSON.
LEONARD B. NEIGHBOUR.